United States Patent [19]

McKnight et al.

[11] 4,108,304

[45] Aug. 22, 1978

[54] POWERED ROLLER ACCUMULATION CONVEYOR

[75] Inventors: Robert J. McKnight, Toms River; Frank J. Neuwirth, Manasquan; Robert W. Gotham, Toms River, all of N.J.

[73] Assignee: Unex Conveying Systems, Inc., Jackson, N.J.

[21] Appl. No.: 879,537

[22] Filed: Feb. 21, 1978

Related U.S. Application Data

[63] Continuation of Ser. No. 713,092, Aug. 10, 1976, abandoned.

[51] Int. Cl.² .............................................. B65G 13/02
[52] U.S. Cl. ..................................... 198/781; 198/790
[58] Field of Search ........................ 198/781, 789, 790

[56] References Cited

U.S. PATENT DOCUMENTS

| | | | |
|---|---|---|---|
| 3,012,652 | 12/1961 | Poel et al. | 198/781 |
| 3,156,345 | 11/1964 | De Good | 198/781 |
| 3,323,636 | 6/1967 | Gotham | 198/790 |
| 3,760,932 | 9/1973 | Schneider | 198/781 |
| 3,967,718 | 7/1976 | Monahan | 198/790 |

*Primary Examiner*—Joseph E. Valenza
*Attorney, Agent, or Firm*—Albert Sperry; Frederick A. Zoda; John J. Kane

[57] ABSTRACT

This invention discloses an accumulation conveyor of the powered roller type, having a power-driven belt passing through a plurality of independent operating zones arranged in tandem along the length of the conveyor. The belt is held in contact with the driven rollers by resiliently-biased pressure rollers, the pressure rollers exerting at least sufficient pressure to maintain the belt in contact with the driven rollers. In each zone, additional pressure is applied to the pressure rollers to increase or decrease the pressure of the belt against the driven rollers. This pressure is applied by spring-biased roller cams actuated by linkages responsive to load-sensing means in a downstream zone and whereby the kinetic energy generated by the moving load is used to actuate the cams.

31 Claims, 9 Drawing Figures

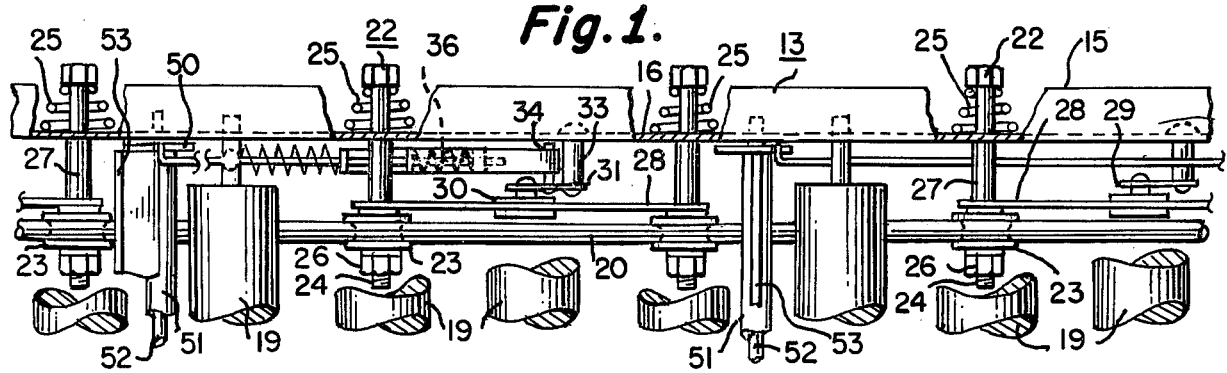
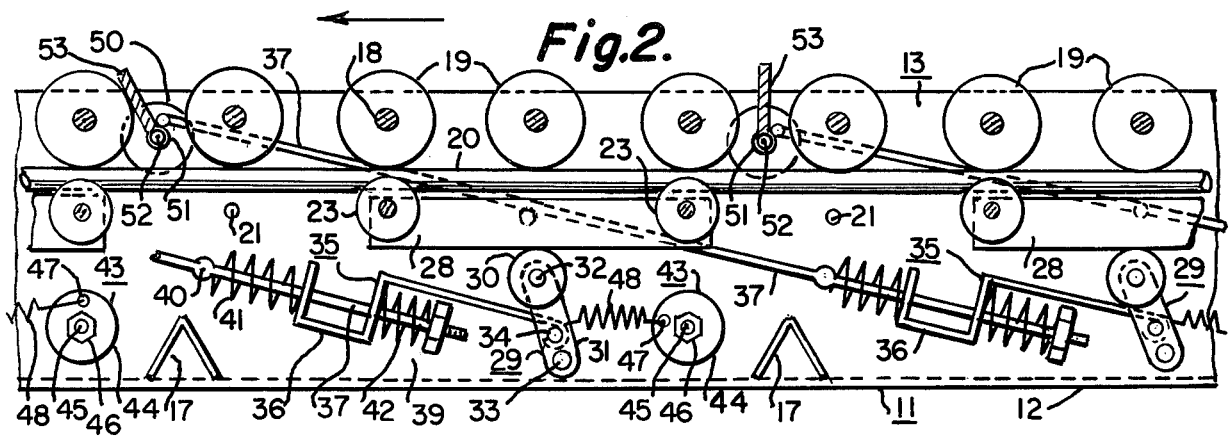
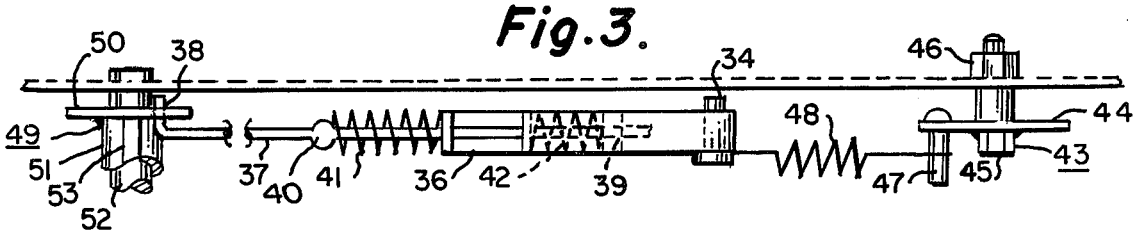
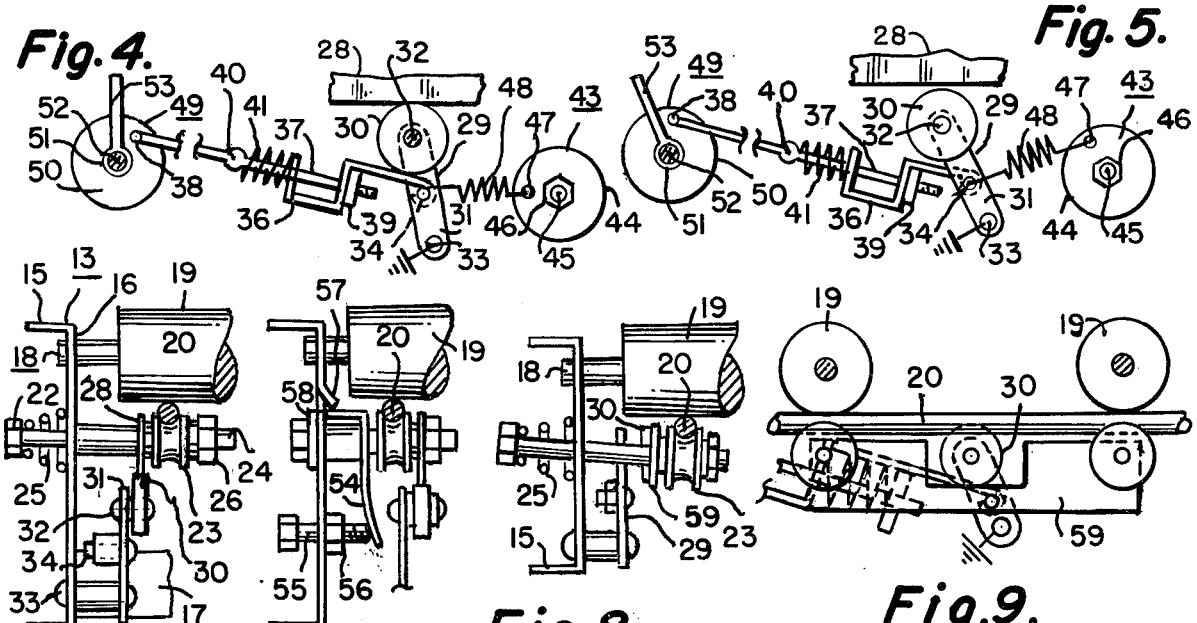

POWERED ROLLER ACCUMULATION CONVEYOR

This application is a continuation of United States Ser. No. 713,092 filed Aug. 10, 1976, now abandoned.

BACKGROUND OF THE INVENTION

1. Field of the Invention

This invention relates to conveyors and, more particularly, to those of the powered roller type in which rollers are powered by means of a power-driven endless belt which, by frictionally engaging the underside of the rollers, causes them to rotate.

This invention relates further to means for regulating the propelling power transmitted to the rollers and thus to control the accumulation pressure exerted against an imposed obstacle, such as a case stop or an accumulation of stalled packages on the conveyor line, which pressure often is sufficient to disrupt the operation or cause damage to the contents of the packages.

2. Description of the Prior Art

In powered roller conveyors, regulation of the propelling power has been attempted by lifting the load, and sometimes the carrying rollers supporting the load, out of contact with the driving belt. This requires a substantial amount of costly energy.

Another means for regulating the propelling power has been to retract the driving means so that it is out of contact with the load. This means usually requires considerable energy to actuate and, if this energy must be supplied by the kinetic energy of the load, it follows that it is not responsive to light loads or mixed loads involving even a small percentage of light-weight articles.

In conveyors of the belt-driven live roller type, articles are propelled by a powered belt held in frictional engagement with the load-carrying rollers. The propelling power is directly proportional to the pressure of the belt against the rollers.

In the conventional belt-driven live roller conveyors, snubber rollers are used, located midway between a pair of load-carrying rollers and so positioned that the belt weaves a serpentine path and has a substantial wrap-around on both snubber and carrying rollers. Belt pressure is regulated by adjusting the belt tension, usually by means of a belt take-up mechanism. To obtain sufficient propelling power, belt must be tightened sufficiently to propel the heaviest anticipated load; actually, the belt must be tightened excessively to compensate for the expansion and contraction of the conveyor elements due to changes in temperature or humidity, and other factors, including permanent belt stretch and wear on the components. In addition to requiring frequent costly adjustments of numerous components, the labyrinth path the belt traverses frequently causes belt-tracking problems. Due to the extreme tension required in the belt, some components, such as the snubber-roller and pulley bearings, must be more durable and more costly than would otherwise be required.

SUMMARY OF THE INVENTION

In the present invention pressure rollers, which serve essentially the same purpose as the snubber-rollers in conventional live-roller conveyors, are located directly beneath the load-carrying rollers. The pressure of the pressure rollers against the belt and the consequent pressure against the load-carrying rollers is provided by two means: (1) by springs or resilient washers, wherein the pressure may be varied by means of nuts which are adjusted to maintain the pressure rollers in contact with the belt but which do not provide sufficient pressure to propel the load, the springs or resilient washers and the aforesaid adjustment nuts being incorporated in the pressure roller assemblies; and (2) by spring-biased roller cams which exert pressure against load bars connecting pairs of pressure rollers, and which are actuated by linkages responsive to load-sensing means, the kinetic energy generated by the moving load supplying the energy to actuate the cams. For purposes of description, the pressure supplied by the springs or resilient washers is designated as the "primary" pressure and the pressure supplied by the spring-biased roller cams is designated as the "supplementary" pressure. Since the primary pressure maintains the pressure rollers in contact with the belt, the supplementary pressure can provide any desired pressure without causing any relative movement between the belt and the load-carrying rollers.

In this embodiment, the conveyor is divided lengthwise into operating zones, of any convenient lengths, with one or more spring-biased cams in each zone. Sensing devices are provided, one for each zone, being positioned a short distance downstream from their associated zones. Each sensing device actuates a cam in a zone upstream from the zone in which the sensing device is located. Springs attached to the cams provide the supplementary pressure. Adjustable tension springs provide a positive pressure which is sufficient to propel the heaviest anticipated load. Compression springs connected to adjustable load-sensing means provide negative pressure acting on the cams. The total resulting pressure of the cams against the load bars can be regulated by adjustment means controlling the respective tension and compression springs.

When an article, on a conveyor with all cams in operational engagement with their associated load-bars, is detected by a sensing means, said sensing means actuates a cam in an upstream zone, thus deactivating said zone. When the article moves beyond the sensing means, the associated zone is reactivated.

If articles are allowed to accumulate on the conveyor as, for example, when a case stop is inserted anywhere along the conveyor, zones upstream thereof will be successively deactivated so that the only line pressure will be in the zone in which the case stop is inserted. This pressure exists because the load-carrying rollers in this zone have not been deactivated.

When the case stop is removed, the articles adjacent thereto move downstream restoring driving power to the adjacent upstream zone. This action is repeated until power is restored to all zones.

An object of this invention is to provide an improved powered roller conveyor wherein the propelling power of the rollers can be regulated by simple and inexpensive means.

Another object of this invention is to provide an improved powered roller conveyor of the accumulation type in which the propelling power can be regulated by simple, mechanical sensing means responsive to light-weight loads.

These and other objects and advantages of this invention will be readily understood by those skilled in the conveyor art upon reading the following specifications and the accompanying drawings in which like reference characters denote like parts in the several views.

It will be understood that the drawings are for purposes of illustration and do not define the scope or limits of the invention reference being had for the latter purpose to the appended claims.

BRIEF DESCRIPTION OF THE DRAWINGS

While the invention is particularly pointed out and distinctly claimed in the concluding portions herein, a preferred embodiment is set forth in the following detailed description which may be best understood when read in connection with the accompanying drawings in which:

FIG. 1 is a plan view of a short section of a roller conveyor showing the load-carrying rollers and a supporting side rail, the driving belt, in this case a cable of circular cross section, the sensors and the means for increasing the pressure of the cable against the rollers, said means consisting of a roller cam actuated by a mechanical linkage responsive to a sensing means, in this case a radially disposed vane attached to a tube rotatably carried on a shaft inserted in orifices in the siderails, and wherein portions of some rollers and of the roller-supporting channel have been broken away to expose the belt-supporting and article-sensing means.

FIG. 2 is a cross-sectional side elevation view of the conveyor of FIG. 1 showing the belt-supporting means under alternate rollers, and rotary sensors and the linkage to roller cam actuators.

FIG. 3 is an enlarged plan view of sensing and actuating mechanism of FIGS. 1 and 2.

FIG. 4 is a side elevation view of a variation of the sensing and actuating mechanism of FIG. 3, wherein one spring is omitted from the actuating linkage and wherein the rotary vane sensor is in a normal position and the roller cam is in contact with the plate linking two adjacent belt supporting pulleys.

FIG. 5 is a side elevation view of sensing and actuating mechanism of FIG. 4 wherein rotary vane sensor has been rotated causing roller cam to retract out of contact with the plate linking two adjacent belt-supporting pulleys.

FIG. 6 is a fragmentary end view of conveyor of FIGS. 1 and 2.

FIG. 7 is a fragmentary end view of conveyor of FIGS. 1 and 2 in which the means for maintaining the cable in contact with the driven roller is a leaf spring.

FIGS. 8 and 9 are fragmentary end and side views respectively of conveyor of FIGS. 1 and 2 in which pressure of the cable against the roller is regulated by an adjustable coil spring, and roller cam, when actuated by sensor, reduces the pressure of the cable against the roller.

DETAILED DESCRIPTION OF A PREFERRED EMBODIMENT

Referring to the drawings, there is disclosed, in FIGS. 1, 2, 3, and 6, a conveyor generally designated 11, comprising a frame 12 formed of two laterally spaced preferably parallel structural siderails 13, here shown as channels, each with generally horizontal flanges 15 outstanding from the web 16 thereof. Cross braces 17 extend between and have ends affixed to the lower portion of webs 16 to provide the rigid frame 12. The normally vertical webs 16 are apertured, as by punching, to receive the axles 18 of rollers 19 constituting the bed of the conveyor. An endless belt 20, of circular cross section, is powered by conventional means, not shown. The direction of travel is indicated by the arrow in FIG. 2.

One of the siderails 13, such as the one shown, is provided with a series of holes 21 located in the web 16 directly beneath each of the axles 18. Adjustable belt-supporting assemblies 22 are provided, each consisting of a grooved wheel or pulley 23 free to rotate on a capscrew 24 which passes through a hole 21 in the web 16 of siderail 13. A compression spring 25 is positioned on the capscrew 24 between the head thereof and the web 16 of siderail 13. A nut 26 is threaded on the capscrew 24 to adjustably hold the assembly 22 in place. A hollow cylindrical spacer 27 is provided to hold the pulley 23 a fixed distance from the web 16 of the siderail 13 by virtue of the capscrew 24 passing therethrough and the fact that it is disposed between the pulley 23 and said siderail.

FIG. 6 illustrates that each hole 21 and the received capscrew 24 are located at such a distance below its overlying axle 18 that the angle between the vertical web 16 of the siderail 13 and the axis of the shaft 24 is slightly greater than 90° with the top pass of the belt 20 in position in the groove of the pulley 23. In operation, tightening of the nut 26 tends to force the shaft 24 to form a right angle with respect to the vertical web 16 of the siderail 13. This results in an increase in pressure between the moving belt 20 and the bottom of the driven roller 19 thereabove and a constant increase of the driving force which is applied to said roller 19; a loosening of the nut 26 has the opposite effect, whereby it is possible to regulate the pressure of the belt on the so-controlled roller or rollers to the extent desired. Pressure thus provided by adjustment of the belt-supporting assembly 22 is defined, for purposes of this invention, as the primary pressure as distinguished from the supplementary pressure as hereinafter defined. It can readily be understood that the primary pressure can be so regulated that, even though the belt remains in contact with the rollers, driving force provided thereby is insufficient to cause the rollers to rotate.

For normal operation, an adjustable belt-supporting assembly 22 under every alternate roller 19 provides adequate driving force to propel articles on the conveyor. When greater driving force is desired, an assembly 22 may be installed under each roller 19.

Connecting each adjoining pair of belt-supporting assemblies 22, there is a plurality of load-bars 28, positioned preferably adjacent to the pulleys 22. A cam assembly 29 consists of a cam roller 30 rotatably mounted by means of shoulder rivet 32, on a cam arm 31 which is pivotally attached, by means of standoff rivet 33, to the web 16 of siderail 13.

The cam roller 30 is maintained in contact with, and exerts pressure against, the load-bar 28 by means of an adjustable tension spring 48, one end of which is connected to pivot pin 34 of cam arm 31 and the other end of which is connected to a pin 47 of rotatable spring adjusting means 43 which includes a washer 44 welded to a shoulder bolt 45 which passes through a web 16 of siderail 13 and is held thereto by nut 46. By rotating spring adjusting means 43, any desired tension may be exerted on cam arm 31 to maintain the desired pressure of cam roller 30 against the load-bar 28. Pressure so exerted is defined as the "supplementary" pressure.

An actuator assembly 35 consists of: a yoke 36, a lateral extension from one leg of which is pivotally attached to cam arm 29 by means of a pivot pin 34; a rod 37 with a threaded end which passes through both legs of yoke 36; a stiff compression spring 42 which is positioned on the threaded end of rod 37 and held thereon by a first stop means such as threaded nut 38; a lighter compression spring 41 positioned on the rod 37 on the side of yoke 36 opposite to the stiff spring 42, said spring 41 being restricted from lengthwise movement on rod 37 by a second stop means such as peen 40. A threaded nut may be used in place of peen 40 to provide adjustment of the compression force in spring 41.

The unthreaded end of rod 37 has a short arm 38, which is bent 90°, which passes through a hole in a washer 50 attached to a tube 51 rotatably mounted on shaft 52 which is inserted in holes in the webs 16 of siderails 13. A projecting vane 53 is attached to tube 51, preferably by welding. This assembly 49 constitutes the sensing means.

Vane 53 is normally in a position such that it will interfere with a package being transported on the conveyor. The propelling force exerted by the driven rollers, on a package being conveyed in the direction indicated by the arrow in FIG. 2, when it strikes the vane 53, is sufficient to cause the tube 51 and its associated washer 50 to rotate. The hole in the washer through which arm 38 passes is so located that rotation of said washer exerts a pull on the actuator assembly 35 tending to pull cam roller out of contact with load-bar 28. It can be understood that there are two opposing forces acting on cam roller 30; one exerted by tension spring 48 regulated by rotating spring adjusting means 33, and the other exerted by the rotation of the sensing vane 53 which, by compressing spring 42, exerts pressure against yoke 36, tending to pull cam roller 30 in a direction which counteracts the effect of spring 48. By proper adjustment, these two forces can be regulated so that the force tending to pull the roller cam 30 away from load-bar 28 never exceeds the force tending to hold said roller cam in contact with said load-bar. Instead, the spring 42 serves only to diminish the pressure of roller cam 30 against load-bar 28 which in turn diminishes the pressure of belt 20 against rollers 19. Hence, no energy need be expended to lift the cam roller and its associated parts to provide driving power for the rollers 19. Furthermore, there need be no relative movement between the belt and the means for applying pressure against the belt. Consequently, a minimum of energy is required to actuate said pressure means.

FIGS. 4 and 5 show a slight modification of the conveyor illustrated in FIGS. 1 and 2, wherein compression spring 42 is omitted. In this embodiment, cam roller 30 is pulled out of engagement with load-bar 28 when sensing vane 53 is rotated.

Looking at FIG. 4, it can be seen that when an article strikes the sensing vane 53, there occurs an instant separation of the cam roller 30 from the load-bar 28 and all of the energy required to overcome the force of tension spring 48 must be instantly supplied by the moving article. In some cases this would require a heavy package; if the package is not heavy enough it may stall.

By adding the second compression spring 42, as in FIG. 2, the energy is gradually accumulated as the vane 53 rotates, being stored in spring 42 until it is sufficient to cause separation of the cam roller from the load-bar. It is not necessary to cause complete separation since, as the energy stored in spring 42 approaches the force of spring 48, the net effective force exerted on the load-bar approaches zero, and by fine tuning the adjustment of the tension and compression springs, the conveyor can function with no movement of the cam rollers except that needed to adapt to irregularities or eccentricities of the assembled parts.

Furthermore, the required energy is provided by a substantial degree of rotation of the vane rather than by an instantaneous shock so that even a light-weight article can provide sufficient energy to actuate the sensing device.

FIG. 7 shows a conveyor similar to that of FIGS. 1 to 6 inclusive wherein coil spring 25 is replaced by resilient washer 58 and a leaf spring 54 has been added to the belt support assembly. The web 16 of siderail 13 is lanced to form projections 57 to prevent upward movement of leaf spring 54, pressure against which is provided by adjustment screw 55 passing through web 16 of siderail 13 and held in position by nut 56. Turning of this screw in a clockwise direction, assuming a right-hand thread, tends to push belt-supporting assembly upward, increasing the pressure of the pulley 23 against the belt 20.

FIGS. 8 and 9 show a conveyor similar to that shown in FIGS. 1 to 7 inclusive wherein the roller cam 30 is located above the load-bar 59 and wherein a tension force, applied by the actuating assembly 35, exerts a downward force on the load-bar and wherein the tension spring 48 and its adjustment means 43 are not required. All of the propelling power is provided by tightening nut 26 sufficiently to propel the maximum load required. The counter-clockwise rotation of the sensing vane, when actuated by a package, results in a reduction of pressure of roller 23 against the propelling member 20 such that the resultant pressure is insufficient to drive rollers 19.

The spring 41 is required to permit the sensing vane 53 to be rotated in a reverse direction, as might happen if a package is intentionally or accidentally pushed upstream on the conveyor, without damaging the components in the actuator assembly 35.

While particular embodiments of this invention have been shown in the drawings and described above, it will be apparent that many changes may be made in the form, arrangement and positioning of the various elements of the combination. In consideration thereof it should be understood that preferred embodiments of this invention disclosed herein are intended to be illustrative only and not intended to limit the scope of the invention.

We claim:

1. An accumulation conveyor comprising a pair of laterally spaced siderails, each having a normally vertical web, a plurality of axles extending between said siderails, a roller rotatably mounted on each axle and adapted to carry articles to be transported by said conveyor, a power-driven propelling member, a plurality of vertically movable rollers supporting the propelling member with adjustable first mechanical means cooperating therewith for urging said rollers upward against the propelling member, said first mechanical means being resilient, and means for detecting the presence of an article on said conveyor, said means being operatively connected to an adjustable second mechanical means which cooperates with said vertically movable rollers for urging a plurality of said rollers selectively either upward or downward to further vary the pressure of said vertically movable rollers against the propelling member by exerting a supplementary force on said vertically movable rollers, said secondary mechanical means including a movable cam means adapted to selectively bias said vertically movable rollers against said propelling member, said secondary mechanical means further including an adjustable tension spring means attached to said cam means and adapted to regulate the bias exerted by said vertically movable rollers against said propelling member, said second mechanical means further including an actuator assembly interconnecting said cam means with said article detecting means and comprising:
  a. a slidable member;
  b. a rod means slidably secured with respect to said slidable member, said rod means including a first stop means and a second stop means thereon; and
  c. a first compression spring means positioned about said rod and abutting said slidable member, said first compression spring means positioned between said second stop means and said slidable member to bias said slidable member with respect to said rod member.

2. The combination set forth in claim 1 wherein the power-driven propelling member is a plastic covered cable and the vertically movable rollers supporting the propelling members contain peripheral grooves in which the propelling member travels and wherein each roller is carried on a threaded shaft passing through an aperture in the web of a siderail.

3. The combination set forth in claim 1 wherein the first mechanical means for urging the rollers upward is a resilient variably exerting force on said shafts tending to reduce the angle the shafts make with the portions of the web thereabove, said force being regulated by screw-adjustmemt means.

4. The combination set forth in claim 1 wherein the means for detecting the presence of an article on the conveyor are elements projecting above the article-supporting rollers which element are displaced by articles passing thereover, said displacement, by means of connecting linkages, activating said second mechanical means for varying the pressure of the vertically movable rollers supporting the propelling member.

5. The combination set forth in claim 1 wherein the second mechanical means for varying the pressure of the vertically movable rollers supporting the propelling member are roller cams, operatively connected to the means for detecting the presence of an article on the conveyor, which are spring-biased to adjustably exert pressure against bars attached to the shafts on which the propelling member supporting rollers are carried.

6. The combination set forth in claim 1 wherein the means for detecting the presence of an article on the conveyor is actuated by the kinetic energy developed by a moving article.

7. The combination set forth in claim 2 wherein the first mechanical means for urging the rollers upward are resilient elements variably exerting force on said shafts tending to reduce the angle the shafts make with the portions of the web thereabove, said force being regulated by screw-adjustmemt means.

8. The combination set forth in claim 2 wherein the means for detecting the presence of an article on the conveyor are elements projecting above the article-supporting rollers which elements are displaced by articles passing thereover, said displacement, by means of connecting linkages, activating said second mechanical means for varying the pressure of the vertically movable rollers supporting the propelling member.

9. The combination set forth in claim 2 wherein the second mechanical means for varying the pressure of the vertically movable rollers supporting the propelling member are roller cams, operatively connected to the means for detecting the presence of an article on the conveyor, which are spring-biased to adjustably exert pressure against bars attached to the shafts on which the propelling member supporting rollers are carried.

10. The combination set forth in claim 2 wherein the means for detecting the presence of an article on the conveyor is actuated by the kinetic energy developed by a moving article.

11. The combination set forth in claim 3 wherein the means for detecting the presence of an article on the conveyor are elements projecting above the article-supporting rollers which elements are displaced by articles passing thereover, said displacement, by means of connecting linkages, activating said second mechanical means for varying the pressure of the vertically movable rollers supporting the propelling member.

12. The combination set forth in claim 3 wherein the second mechanical means for varying the pressure of the vertically movable rollers supporting the propelling member are roller cams, operatively connected to the means for detecting the presence of an article on the conveyor, which are spring-biased to adjustably exert pressure against bars attached to the shafts on which the propelling member supporting rollers are carried.

13. The combination set forth in claim 3 wherein the means for detecting the presence of an article on the conveyor is actuated by the kinetic energy developed by a moving article.

14. The combination set forth in claim 4 wherein the second mechanical means for varying the pressure of the vertically movable rollers supporting the propelling member are roller cams, operatively connected to the means for detecting the presence of an article on the conveyor, which are spring-biased to adjustably exert pressure against bars attached to the shafts on which the propelling member supporting rollers are carried.

15. The combination set forth in claim 4 wherein the means for detecting the presence of an article on the conveyor is actuated by the kinetic energy developed by a moving article.

16. The combination set forth in claim 5 wherein the means for detecting the presence of an article on the conveyor is actuated by the kinetic energy developed by a moving article.

17. The combination set forth in claim 7 wherein the means for detecting the presence of an article on the conveyor are elements projecting above the article-supporting rollers which elements are displaced by articles passing thereover, said displacement, by means of connecting linkages, activating said second mechanical means for varing the pressure of the vertically movable rollers supporting the propelling member.

18. The combination set forth in claim 7 wherein the second mechanical means for varying the pressure of the vertically movable rollers supporting the propelling member are roller cams, operatively connected to the means for detecting the presence of an article on the conveyor, which are spring-biased to adjustably exert pressure against bars attached to the shafts on which the propelling member supporting rollers are carried.

19. The combination set forth in claim 7 wherein the means for detecting the presence of an article on the conveyor is actuated by the kinetic energy developed by a moving article.

20. The combination set forth in claim 8 wherein the second mechanical means for varying the pressure of the vertically movable rollers supporting the propelling member are roller cams, operatively connected to the means for detecting the presence of an article on the conveyor, which are spring-biased to adjustably exert pressure against bars attached to the shafts on which the propelling member supporting rollers are carried.

21. The combination set forth in claim 8 wherein the means for detecting the presence of an article on the conveyor is actuated by the kinetic energy developed by a moving article.

22. The combination set forth in claim 9 wherein the means for detecting the presence of an article on the conveyor is actuated by the kinetic energy developed by a moving article.

23. The combination set forth in claim 11 wherein the second mechanical means for varying the pressure of the vertically movable rollers supporting the propelling member are roller cams, operatively connected to the means for detecting the presence of an article on the conveyor, which are spring-biased to adjustably exert pressure against bars attached to the shafts on which the propelling member supporting rollers are carried.

24. The combination set forth in claim 11 wherein the means for detecting the presence of an article on the conveyor is actuated by the kinetic energy developed by a moving article.

25. The combination set forth in claim 14 wherein the means for detecting the presence of an article on the conveyor is actuated by the kinetic energy developed by a moving article.

26. The combination set forth in claim 17 wherein the second mechanical means for varying the pressure of the vertically movable rollers supporting the propelling member are roller cams, operatively connected to the means for detecting the presence of an article on the conveyor, which are spring-biased to adjustably exert pressure against bars attached to the shafts on which the propelling member supporting rollers are carried.

27. The combination set forth in claim 17 wherein the means for detecting the presence of an article on the conveyor is actuated by the kinetic energy developed by a moving article.

28. The combination set forth in claim 18 wherein the means for detecting the presence of an article on the conveyor is actuated by the kinetic energy developed by a moving article.

29. The combination set forth in claim 20 wherein the means for detecting the presence of an article on the conveyor is actuated by the kinetic energy developed by a moving article.

30. The combination set forth in claim 26 wherein the means for detecting the presence of an article on the conveyor is actuated by the kinetic energy developed by a moving article.

31. The conveyor as defined in claim 1 further comprising a second compression spring means positioned about said rod means and in abutment with said slidable member and said first stop means of said rod means to bias said rod means with respect to said slidable member oppositely with respect to the bias of said first stop means.

* * * * *